UNITED STATES PATENT OFFICE.

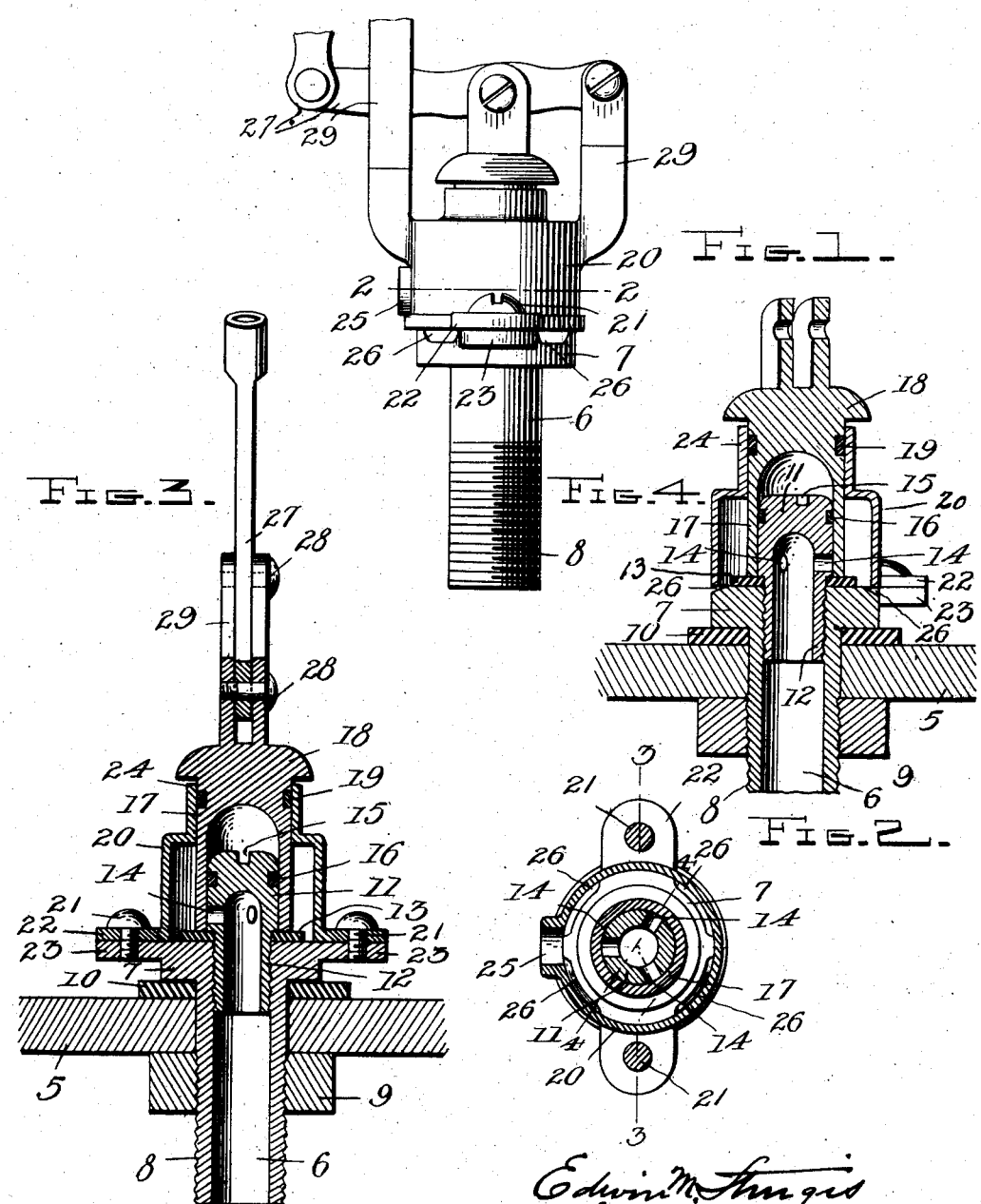

EDWIN M. STURGIS, OF HAMILTON, OHIO, AND CHARLES A. LEMING, OF CONNERSVILLE, INDIANA.

VALVE.

No. 893,884.  Specification of Letters Patent.  Patented July 21, 1908.

Application filed May 27, 1907. Serial No. 375,909.

*To all whom it may concern:*

Be it known that we, EDWIN M. STURGIS and CHARLES A. LEMING, citizens of the United States, residing at Hamilton, in the county of Butler and State of Ohio, and Connersville, county of Fayette, and State of Indiana, respectively, have invented certain new and useful Improvements in Valves, of which the following is a specification.

This invention is a valve, and more particularly a float-controlled valve for flushing tanks.

The invention has for its object an improved and simplified valve structure, and a packing, the parts being arranged so that the packing is easily accessible for replacement when worn.

In the accompanying drawing Figure 1 is an elevation of the valve. Fig. 2 is a horizontal section on the line 2—2 of Fig. 1. Fig. 3 is a vertical section on the line 3—3 of Fig. 2. Fig. 4 is a vertical section on the line 4—4 of Fig. 2.

Referring specifically to the drawing, 5 denotes the floor of a tank to which the valve is applied. The supply connection of the valve comprises a tubular stem 6 having at one end a flange 7. The stem seats in an opening in the tank floor with the flange 7 above said floor, and below the floor, the stem is threaded exteriorly as indicated at 8 to receive a nut 9 for clamping the parts to the floor. Between the floor and the bottom of the flange is a gasket 10.

Above the flange 7 is a valve seat which is a hollow plug 11 having a threaded stem 12 which screws into the threaded upper end of the bore of the stem 6. On the stem 12, between the bottom of the plug 11 and the top of the flange 7 is arranged a gasket 13. Near the bottom of the plug are outlets 14. The top of the plug has a nick 15 for the application of a screw-driver when the plug is to be removed from the stem 6. On the outside of the plug near the top thereof is an annular groove to receive a packing ring 16.

The valve proper is a sleeve 17 which is fitted slidably on the plug 11 to cover and uncover the outlets 14. The sleeve is carried by a plug 18 which is connected to the operating mechanism of the valve. The plug has near its upper end an annular groove to receive a packing ring 19.

The valve and its seat are inclosed by a housing 20 which is open at its base and seats on the flange 7 being secured thereto by screws or bolts 21 which pass through alined openings in fastening flanges 22 at the base of the housing and extensions 23 on the flange 7. At the top of the housing is a contracted portion or neck 24 having a bore in which the plug 18 works. At the base of the housing is an outlet or opening 25. Outlets for the housing are also provided by cutting away the periphery of the flange 7 as indicated at 26. These cuts extend inwardly a short distance beyond the inner wall of the housing as shown in Fig. 4.

By the structure herein described a valve is had which is simple in construction, and efficient and reliable in operation. Leakage is effectually prevented by the double packing of the valve-seat and the packing on the valve-plug. The parts can be readily assembled and disconnected. If the packing requires renewal it is necessary only to remove the housing 20 which is readily done by taking out the screws 21. The levers 27 of the operating mechanism are pivoted on screw bolts 28 passing through standards 29 rising from the housing so that the valve plug can be removed without taking the housing off by simply taking out said screws and disconnecting the levers.

We claim:

1. In a valve, the combination with a supply-connection comprising a tubular stem having at one end a flange, of a valve-seat comprising a plug rising from the flange and having an inlet and outlets, a gasket at the base of the plug, a housing on the flange and having an opening and outlets, and a plug entering the housing through said opening, and having a depending sleeve slidably fitting the valve-seat plug and seating on the aforesaid gasket.

2. In a valve, the combination with a supply-connection comprising a tubular stem having at one end a flange, of a valve-seat comprising a plug having a threaded stem screwing into the bore of the tubular stem, said plug having an inlet and outlets, a gasket on the tubular stem between the bottom of the plug and the top of the aforesaid flange, a housing on the flange and having an opening and outlets, and a plug entering the housing through said opening, and having a depending sleeve slidably fitting the valve-seat plug and seating on the aforesaid gasket.

3. In a valve, the combination with a supply-connection comprising a tubular stem having at one end a flange, of a valve-seat comprising a plug rising from the flange and having an inlet and outlets, a packing ring around the plug, a gasket at the base of the plug, a housing on the flange and having an opening and outlets, and a plug entering the housing through said opening, and having a depending sleeve slidably fitting the valve-seat plug and seating on the aforesaid gasket.

In testimony whereof we affix our signatures, in presence of witnesses.

EDWIN M. STURGIS.
CHARLES A. LEMING.

Witnesses:
WALTON W. BOWERS,
THEO. E. BOCK,
WILLIAM E. OCHILTREE,
EDWIN G. JOHNSTON.